Aug. 25, 1959     G. H. N. BESSETTE     2,900,834

AUTOMATIC VARIABLE SPEED PULLEY

Filed June 5, 1958     2 Sheets-Sheet 1

INVENTOR
Georges Henri N. BESSETTE

ATTORNEYS

INVENTOR
Georges Henri N. BESSETTE
BY
ATTORNEYS

2,900,834

AUTOMATIC VARIABLE SPEED PULLEY

Georges Henri N. Bessette, Iberville, Quebec, Canada

Application June 5, 1958, Serial No. 740,135

4 Claims. (Cl. 74—230.17)

The present invention relates to variable diameter V-belt pulleys of the type having two pulley halves axially displaceable towards one another and having opposite inclined belt engaging surfaces.

The present invention is more particularly concerned with a variable diameter V-belt pulley of the character above mentioned in which the effective diameter of the pulley varies in accordance with the load applied to the pulley.

In various applications of power transmission involving variations in the load, it is desirable to protect the driving motor against overloading to prevent damage to the motor. Various devices are used for this purpose, such as, clutch devices wherein the clutch disks can slip with respect to each other above a predetermined transmitted torque, or, in the case of electric motors, current responsive overload tripping relays.

However, in certain applications where uniform speed is not an essential factor, and wherein the load may remain at an increased value for a considerable period of time, the above mentioned known devices cannot be used to advantage. For instance, the above noted frictional clutch develops excessive heat and the overload tripping relay unduely stops the electric motor when it would have been possible to continue running of the motor at a reduced speed.

Therefore, the main object of the present invention is the provision, in a power transmission, of a variable diameter V-belt pulley arrangement which is responsive to the load on the pulley such that an increasing load imparted to the transmission will cause a decrease in the rotation speed of the driven member.

Yet another important object of the present invention is the provision of a load responsive variable diameter pulley of the character described in which the effective diameter of the pulley adjusts itself in a completely automatic manner in accordance with the load on the pulley.

The foregoing and other important objects of the present invention will become more apparent during the following disclosure and by referring to the drawings in which.

Referring now more particularly to the drawings in which like reference characters indicate like elements throughout, the invention will now be described for the case in which the pulley is a driving pulley.

Figure 1:
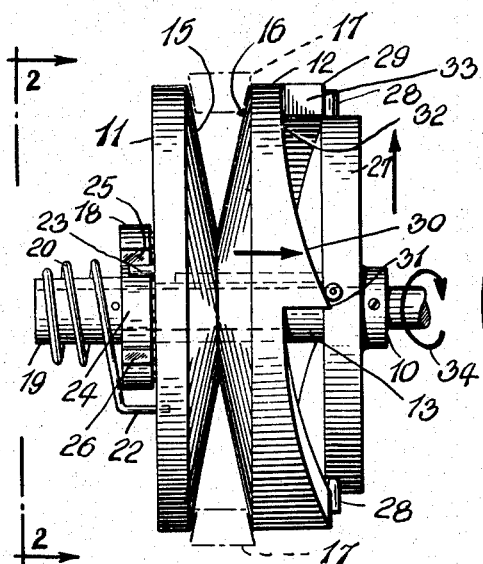
Figure 1 is a side elevation of a first embodiment of the pulley of the present invention.

Reference numeral 10 indicates a driving shaft which is adapted to be connected to a suitable driving means such as an electric motor, internal combustion engine or the like (not shown). Two pulley halves 11 and 12 are mounted on the driving shaft 10 and are freely rotatable with respect to the latter; however, the pulley halves are arranged to rotate in unison with respect to each other and they are also arranged for relative axial movement towards or away from each other. More particularly, a sleeve 13 (see Figure 1) surrounds the shaft 10 and is freely rotatable thereon. The sleeve 13 is fastened to the pulley half 11, while the other pulley half 12 is axially movable on the sleeve 13. The pulley halves 11 and 12 and sleeve 13 are provided with a keyway in which a key 14 is inserted to prevent relative rotation between the sleeve 13 and pulley halves 11 and 12.

The pulley halves 11 and 12 have oppositely inclined surfaces 15 and 16, forming a belt groove and adapted to engage the opposite side faces of a V-belt, generally indicated at 17.

Figure 3:
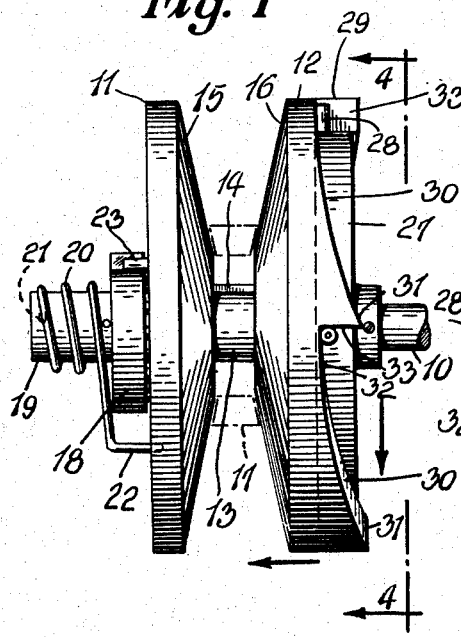
Figure 3 is a side elevation of the embodiment of Figure 1 shown in another adjusted position.
Figure 4:
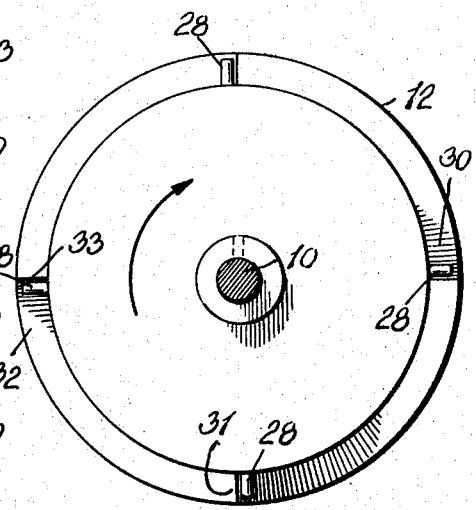
Figure 4 is an end view, partly in cross-section, taken along line 4—4 of Figure 3.

When the pulley halves 11 and 12 are in their innermost position, shown in Figure 1, the V-belt 17 runs on the periphery of the inclined surfaces 15 and 16, and when the pulley halves 11 and 12 are in their outermost position, as shown in Figure 3, the V-belt 17 engages the radially inner marginal portion of the inclined surfaces 15 and 16 to thereby ride at a minimum speed.

A flange 18 is mounted on and secured to the driving shaft 10 adjacent the outer face of the pulley half 11. The flange 18 has an axially, outwardly projecting cylindrical extension 19 fitting over the end portion of the driving shaft 10. A heavy coil spring 20 is wound a few turns over the cylindrical extension 19 and has one free end 21 inserted into aligned registering holes made in the cylindrical extension 19 and in the driving shaft 10 to thereby secure the flange 18 and its cylindrical extension to the driving shaft and also said end of the coil spring to the driving shaft. The other end 22 of the coil spring 20 is secured to the pulley half 11 as by entering a suitable bore made in said pulley half at a point radially outwardly spaced from the outside periphery of the flange 18.

Figure 2:
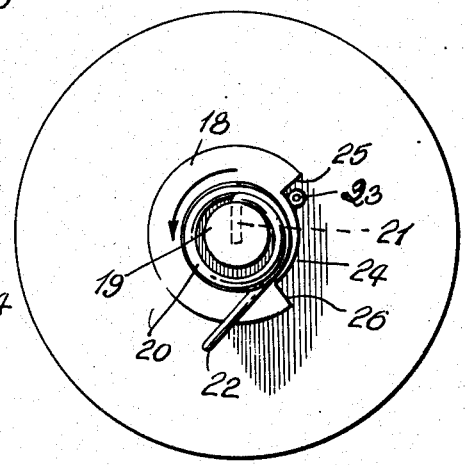
Figure 2 is an end elevation taken along line 2—2 of Figure 1.

The coil spring 20 does not exert any axial force on the pulley half 11 but only serves to urge rotation of the pulley half 11 relatively to the driving shaft 10. Said relative rotation or oscillating movement is limited by means of a pin 23 secured to the pulley half 11 projecting axially from the outer face thereof and engaging a recessed portion 24 of the flange 18. Said recessed portion 24 forms two abutment shoulders 25 and 26 which abut the pin 23 in the two angular limit positions of the pulley half 11 with respect to the flange 18 and driving shaft 10. The coil spring 20 is stressed to urge rotation of the pulley halves 11 and 12 in the direction of rotation of the driving shaft 10. Therefore, the coil spring normally maintains the pin 23 in engagement with the leading abutment shoulder 25, as clearly shown in Figure 2.

A disk-shaped plate 27 is mounted on and secured to the driving shaft 10 adjacent the outer face of the pulley half 12. Said disk-shaped plate 27 is provided at its periphery with a plurality of radially outwardly directed pins 28. The pulley half 12 is provided with an integral cylindrical flange extending in opposite direction to its inclined surface 16 and having an internal diameter slightly greater than the external diameter of the disk plate 27 so as to be able to telescope over the latter. The cylindrical extension 29 has a profiled or cut out outer edge forming as many cam edges 30 as there are pins 28. In the embodiment shown in Figures 1 to 4 inclusive, there are four pins 28 and, therefore, four cam edges 30. Each cam edge 30 may be straight, or preferably it has a hyperbolic or other compound curve defining an axially outermost end 31 and an axially innermost end 32, the latter being adjacent a shoulder 33 formed by the end 31 of the next cam edge 30.

In the innermost position of the pulley halves 11 and 12, the pins 28 of the plate 27 engage the cam edges 30 at their outermost end 31, while in the outermost position of the pulley halves 11 and 12, the pins 27 engage the innermost ends 32 of the cam edges 30 and abut against the shoulders 33, so that, in the latter position, the plate 27 shares in the transmission of the driving force from the driving shaft to the pulley halves, together with flange 18 and pin 23.

The variable diameter V-type pulley just described operates as follows:

The driving shaft 10, rotating in the direction of the arrow 34 shown in Figure 1, transmits its force of rotation to pulley halves 11 and 12 through the coil spring 20. The coil spring 20 is calibrated in accordance with the power rating of the driving motor in such a way that for all loads below a predetermined load, the coil spring 20 maintains the pulley halves 11 and 12 in an angular position with respect to the shaft 10, such that the pin 23 abuts against the leading abutment shoulder 25 and such that the pins 28 of the disk plate 27 abut the cam edges 30 at their outermost ends 31, whereby the axially movable pulley half 12 is maintained by the plate 27 in its innermost position with respect to the pulley half 11, as shown in Figure 1. Thus, for loads below the predetermined load, the variable diameter pulley has its maximum effective diameter and the V-belt 17 rides at maximum speed at the outer periphery of the inclined surfaces 15 and 16.

When the resistance of the driven pulley connected to the belt 17 increases the load on the driving pulley beyond the above mentioned predetermined load, the belt 17 imparts a retarding force on the pulley halves 11 and 12, which acts against the action of the coil spring 20 thereby causing retardation of the pulley halves 11 and 12 with respect to the direction of rotation of the driving shaft 10. The pin 23 on the pulley half 11 now takes a position intermediate the shoulders 25 and 26 and the pins 28 of the disk plate 27 are now opposite an intermediate portion of the cam edges 30, thereby allowing outward axial movement of the pulley half 12 with respect to the pulley half 11, whereby the effective diameter of the driving pulley is reduced and the V-belt 17 is caused to ride at a reduced speed, thus preventing overloading of the motor. With a still greater load on the driving pulley, the force of the coil spring 20 is finally completely overcome and the pulley halves 11 and 12 assume a completely retarded position with respect to the driving shaft 10, in which pin 23 abuts the trailing abutment shoulder 26 and the pins 28 abut the shoulders 23 of the cam edges 30, as shown in Figure 3. In this position the two pulley halves take their outermost position with respect to each other and the V-belt 17 rides on the inner periphery of the inclined surfaces 15 and 16. In this position the belt rides at its minimum speed.

From the foregoing it will be apparent that within certain limits the increase of load on the driving pulley is compensated by a reduction in effective diameter so as to maintain the power requirements substantially constant and such that the driving motor will not become overloaded beyond its horsepower rating.

Figure 6:
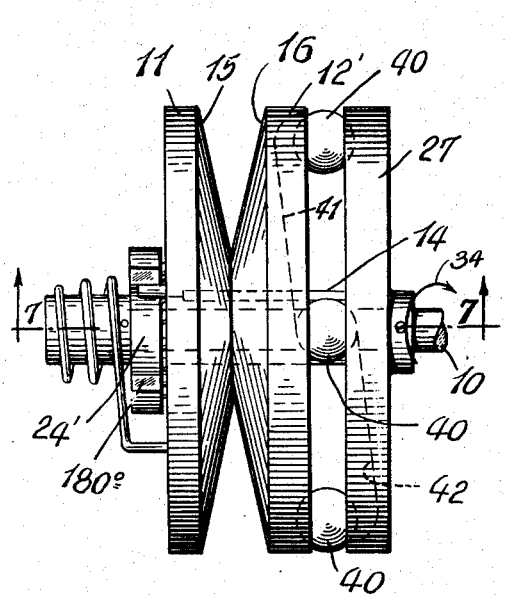
Figure 6 is a side elevation of a second embodiment.

The embodiment shown in Figures 6 to 8 inclusive has the same general construction as the first embodiment described hereinabove and operates on the same principle except that the friction produced by the pins 28 sliding on the cam edges 30 is eliminated by the provision of balls 40 disposed between the disk plate 27' and the outer face of the pulley half 12'. More particularly, the balls 40 engage arcuate opposed recesses 41 and 42 made in the pulley 12' and disk plate 27' respectively. Said recesses 41 and 42 extend along a circle concentric with the driving shaft 10. Each recess 41 or 42 has a circular cross-section to fit the balls 40 and has a shallow end 43 and a deep end 44 with a uniformly inclined intermediate portion. As shown in Figure 6, the shallow ends 43 of the recesses 41 and 42 are disposed opposite each other and the balls 40 are disposed in said shallow ends when the pulley halves are in their innermost position. Increasing retardation of the pulley halves 11 and 12' with respect to the driving shaft 10 up to an angular displacement of 180° with respect to said shaft will finally cause the deep portions 44 of the recesses 41 and 42 to be opposite each other and the balls 40 to be disposed in said deep end portions 44, in which position the pulley half 12' will take its axially innermost position with respect to the pulley half 11.

In the second embodiment in order to allow retardation of the pulley halves 11 and 12 a full half turn with respect to the shaft 10, the flange 18' is provided with a recessed portion 24' extending through half a circle instead of through one-quarter of a circle as in the first embodiment.

Figure 7:
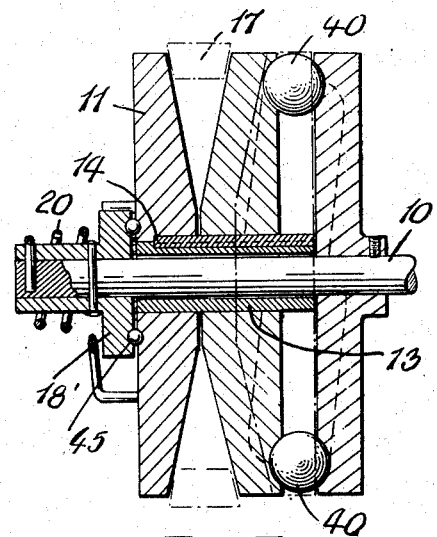
Figure 7 is a longitudinal section along line 7—7 of Figure 6.
Figure 5:
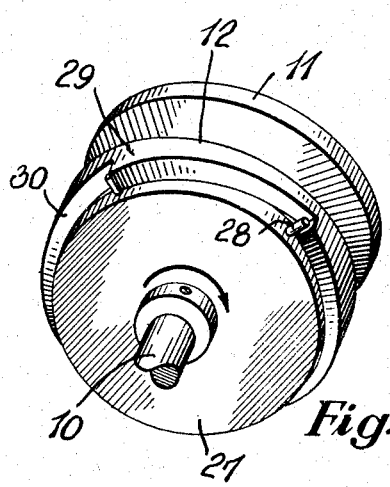
Figure 5 is a perspective view of the first embodiment.
Figure 8:
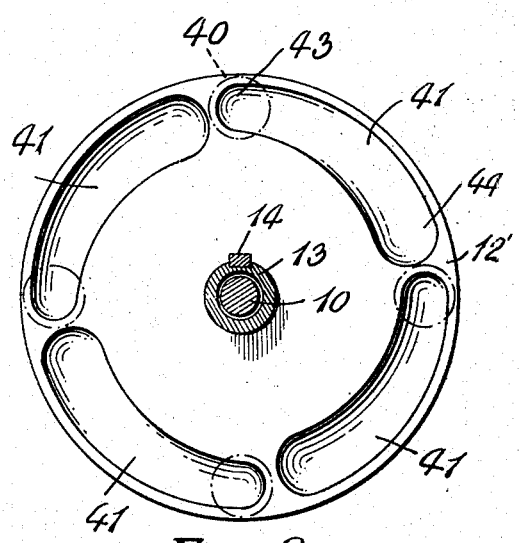
Figure 8 is an elevation of the outside face of one of the pulley halves of the embodiment of Figure 6.

In order to minimize friction between the pulley half 11 and the flange 18, a ball bearing arrangement, generally indicated at 45, may be provided between the adjacent faces of said members, as clearly shown in Figure 7.

If the variable diameter pulley, in accordance with the present invention, is used with a conventional driven pulley of a fixed diameter, any conventional means will be obviously used for offsetting the slack in the belt such as by using a belt idler or by mounting the driving and driven shafts for compensating movement toward and away from each other.

In the embodiments described hereinabove, the pulley of the present invention is used as a driving pulley. However, it is possible to use said pulley as a driven pulley by simply reversing the direction of action of the spring 20, so that the spring will urge the pulley half 11, referring to Figure 1, against the trailing abutment shoulder 26 with respect to the direction of rotation of the driven shaft 10, whereby the driven pulley takes the position shown in Figure 3 which will be the position for normal load applied to the shaft 10.

When a load exceeding the normal load is applied to the shaft 10, the latter will retard with respect to the pulley halves 11 and 12, against the action of the spring, whereby the pulley halves will be brought closer together up to the final position shown in Figure 1, whereby the driven shaft will be rotated at a slower speed.

From the foregoing it is apparent that a transmission can consist of a belt connecting a driving and driven pulley in which both pulleys are made in accordance with the present invention and made in identical manner except for the direction of action of the coil spring 20; in this way a greater range of speed ratios can be achieved to thereby compensate for large torque variations.

While preferred embodiments in accordance with the present invention have been illustrated and described, it is understood that various modifications may be resorted to without departing from the spirit and scope of the appended claims.

I claim:

1. A variable speed power transmission comprising a belt pulley mounted on a shaft and composed of two primary parts cooperating to form a variable belt groove and having freedom for oscillating movement with respect to the shaft, one of said primary parts also having freedom for axial movement with respect to the shaft, secondary pulley parts nonrotatably secured with respect to the shaft externally adjacent the respective primary parts, the axially movable primary part and associated secondary part having cooperating means for causing axial displacement of said one primary part upon oscillating movement of said primary parts with respect to said shaft, elastic means connected to said shaft and to said primary parts, and cooperating means between the other secondary part and the primary part having only freedom for oscillating movement to limit the oscillating movement of said primary parts with respect to said shaft.

2. A variable diameter pulley comprising a rotatable member, two spaced flanges secured to said rotatable member, a sleeve mounted for free rotation on said rotatable member intermediate said two flanges, a pair of belt groove forming disks mounted on said sleeve for rotation in unison therewith, one of said disks being axially movable with respect to said sleeve and to the other of said disks, a coil spring connected between said rotatable member and one of said disks, a pin projecting from said last named disk, abutment means on the flange adjacent said last named disk for abutting said pin and for thereby limiting the angular movement of said two disks with respect to said rotatable member between two limit angular positions, said coil spring urging said disks towards one of said limit positions, and cam means between said axially movable disk and the flange disposed adjacent to said axially movable disk for axially displacing said axially movable disk in dependence upon the angular position of said disks with respect to said rotatable member.

3. A variable diameter pulley as claimed in claim 2, wherein said cam means include pins outwardly, radially projecting from the periphery of said last named flange and a cylindrical extension on said axially movable disk, said cylindrical extension forming inclined cam edges engageable by said pins.

4. A variable diameter pulley as claimed in claim 2, wherein said cam means include opposite circularly extending grooves coaxial with said rotatable member and made in the opposite adjacent faces of said axially movable disk and of the flange disposed adjacent thereto, said grooves having gradually increasing depths from end to end and a ball disposed in each pair of opposite grooves.

References Cited in the file of this patent
UNITED STATES PATENTS

| | | |
|---|---|---|
| 2,607,235 | Ruegenberg | Aug. 19, 1952 |

FOREIGN PATENTS

| | | |
|---|---|---|
| 30,003 | Great Britain | of 1912 |
| 1,124,210 | France | June 25, 1956 |